Figure 1:
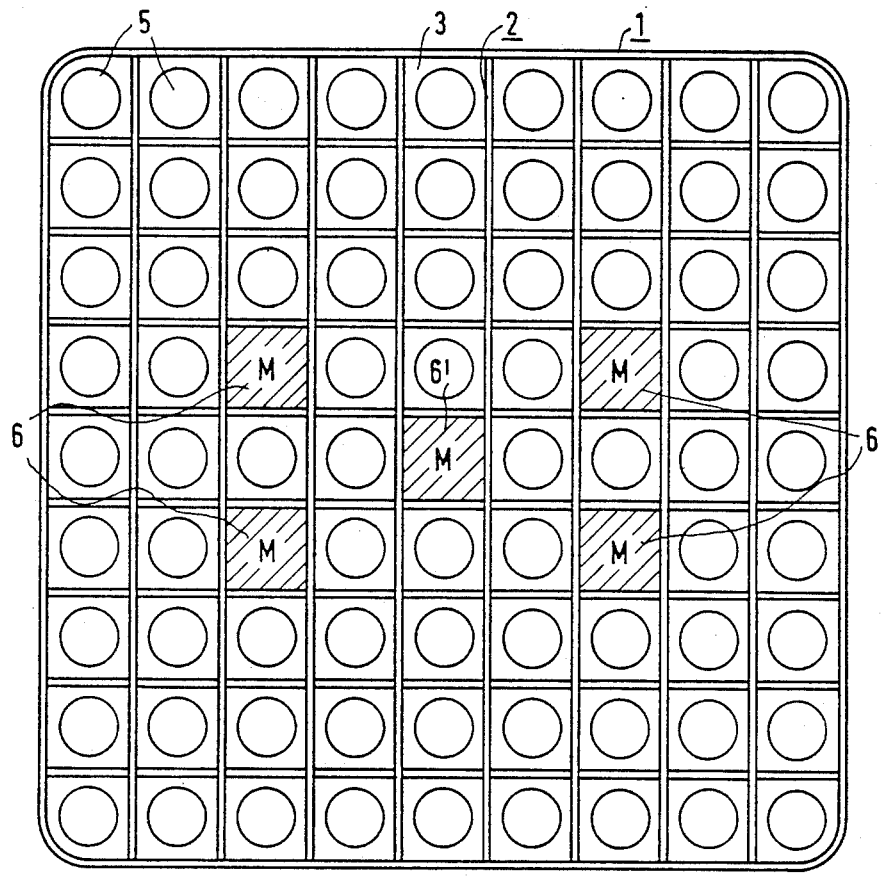

United States Patent [19]

Suchy

[11] Patent Number: 4,632,805

[45] Date of Patent: Dec. 30, 1986

[54] FUEL ASSEMBLY WITH SQUARE CROSS SECTION FOR WATER-COOLED NUCLEAR REACTORS

[75] Inventor: Peter Suchy, Erlangen, Fed. Rep. of Germany

[73] Assignee: Kraftwerk Union Aktiengesellschaft, Mülheim, Fed. Rep. of Germany

[21] Appl. No.: 589,512

[22] Filed: Mar. 14, 1984

[30] Foreign Application Priority Data

Mar. 16, 1983 [DE] Fed. Rep. of Germany ....... 3309449

[51] Int. Cl.⁴ ................................................ G21C 3/32
[52] U.S. Cl. .................................... 376/446; 376/440; 376/444; 376/447; 376/448
[58] Field of Search ............... 376/446, 447, 440, 444, 376/448

[56] References Cited

U.S. PATENT DOCUMENTS 3,799,839 3/1974 Fischer ................................. 376/447
3,802,995 4/1974 Fritz ..................................... 376/440
4,314,884 2/1982 Fanning ............................... 376/444
4,378,329 3/1983 Uchikawa ........................... 376/447

Primary Examiner—Donald P. Walsh
Attorney, Agent, or Firm—Herbert L. Lerner; Laurence A. Greenberg

[57] ABSTRACT

A fuel assembly with a square cross section for water-cooled nuclear reactors, the fuel assembly having fuel rods disposed in a square array prescribed by spacers defining square grid meshes includes rods without fuel disposed, instead of the respective fuel rods, at individual positions of the square array distant from the marginal edge of the fuel-assembly cross section, for varying moderation ratio of the fuel assembly, the rods without fuel having a square cross section smaller than the cross section of the respective grid meshes only by a clearance sufficient for assembling the rods without fuel in the respective grid meshes and disassembling the rods without fuel from the respective grid meshes.

5 Claims, 4 Drawing Figures

FUEL ASSEMBLY WITH SQUARE CROSS SECTION FOR WATER-COOLED NUCLEAR REACTORS

The invention relates to a fuel assembly with a square cross section for water-cooled nuclear reactors, the fuel assembly having fuel rods disposed in a square raster or array which is prescribed by spacers with square grid meshes, rods without fuel being disposed at individual raster positions distant from the marginal edge or rim of the fuel assembly cross section for varying the moderation ratio.

Such a fuel assembly has become known heretofore, for example, from U.S. Pat. No. 3,802,995. In FIG. 7 thereof, two so-called water rods are disposed approximately in the middle of a fuel assembly provided for a boiling-water reactor and in the vicinity of fuel rods containing plutonium, the two so-called water rods being near the center of the fuel-assembly cross section and being located on a diagonal adjacent one another. These so-called water rods are rods which are located in the spacer in normal or conventional fuel rod positions but contain water instead of fuel for the purpose of varying the moderation ratio. The water rods have a circular cross section, the same as the cross section of the fuel rods. The only difference between the water rods and the fuel rods is merely that the tube forming the water rod has several openings at the lower and upper ends thereof through which a connection with the cooling water flowing around the fuel rod is provided.

It is an object of the invention to provide a fuel assembly with a square cross section for water-cooled nuclear reactors which affords a greater variation of the moderation ratio than in heretofore known fuel assemblies of this general type without requiring any change in the basic design of the conventional fuel assembly.

With the forecoing and other objects in view, there is provided, in accordance with the invention, a fuel assembly with a square cross section for water-cooled nuclear reactors, the fuel assembly having fuel rods disposed in a square array prescribed by spacers defining square grid meshes, comprising rods without fuel disposed, instead of the respective fuel rods, at individual positions of the square array distant from the marginal edge of the fuel-assembly cross section, for varying moderation ratio of the fuel assembly, the rods without fuel having a square cross section smaller than the cross section of the respective grid meshes only by a clearance sufficient for assembling the rods without fuel in the respective grid meshes and disassembling the rods without fuel from the respective grid meshes.

With the invention, the cross section determined by the fuel-free rod for varying the moderation ratio is increased. At the same time, an advantage is obtained in that the coolant flow in the vicinity of the respective grid mesh enclosing the respective non-fueled rod is reduced so that heating in the fuel assembly is increased. This advantage is able to be utilized not only if the fuel-free cross section includes the cooling water per se as the moderator, but also if special moderators, such as zirconium hydride, zirconium oxide, beryllium or $D_2O$, for example, are used. In the case wherein the cross section of the fuel-free rods is determined by a cladding tube, in accordance with another feature of the invention, the tube is advantageously provided with a cross section having a square outer edge or margin and a cylindrical inner edge or margin. This applies especially to the case wherein a solid moderator is used which can be produced and introduced more easily in the form of cylindrical pellets, than for a cladding tube, which has an inner edge defining a square cross section like that of the outer cross section.

The invention is of interest especially for boiling-water reactors and is then realized, in accordance with further features of the invention, by the fuel-free rods having square cross sections arranged symmetrically and, especially, in cruciform shape with respect to the center of the fuel-assembly cross section, where the greatest local steam production occurs.

Other features which are considered as characteristic for the invention are set forth in the appended claims.

Although the invention is illustrated and described herein as embodied in a fuel assembly with square cross section for water-cooled nuclear reactors, it is nevertheless not intended to be limited to the details shown, since various modifications and structural changes may be made therein without departing from the spirit of the invention and within the scope and range of equivalents of the claims.

Figure 2:
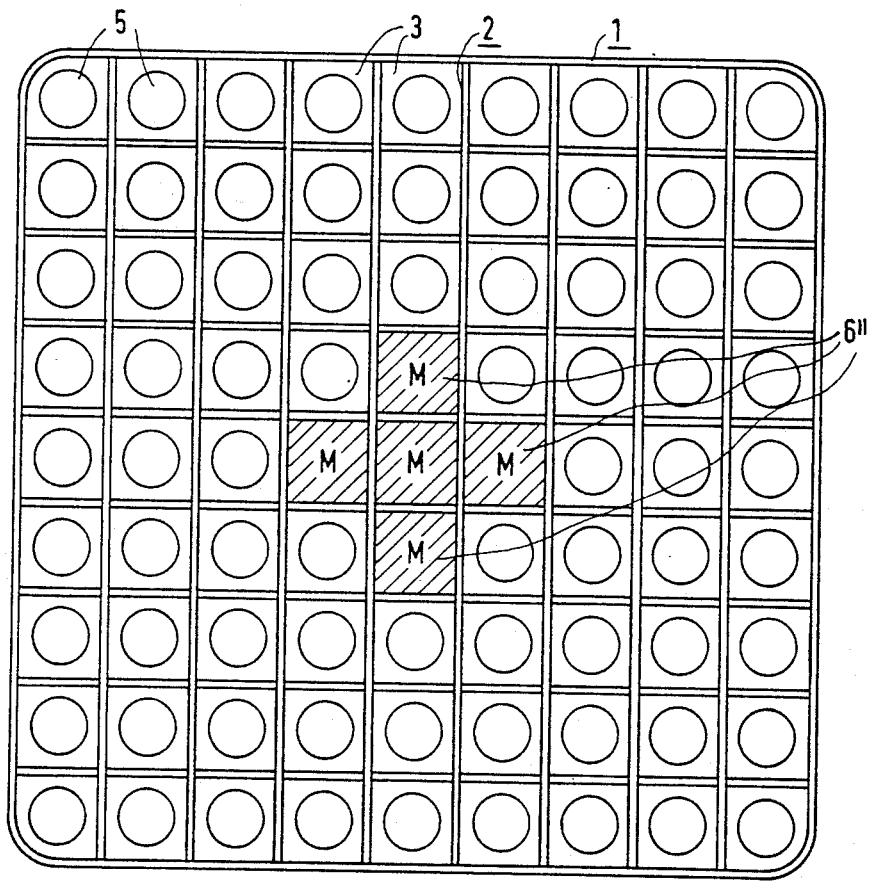
Figure 3:
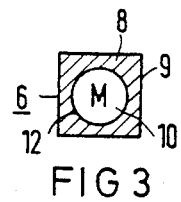
Figure 4:
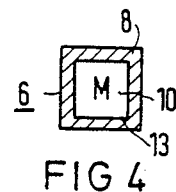

The construction and method of operation of the invention, however, together with additional objects and advantages thereof will be best understood from the following description of specific embodiments when read in connection with the accompanying drawings, in which:

FIGS. 1 and 2 are diagrammatic cross-sectional views of two different embodiments of a fuel assembly of a boiling-water reactor; and FIGS. 3 and 4 are diagrammatic cross sectional views of two different embodiments of a tube for the rods without fuel which are constructed in accordance with the invention.

Referring now to the drawing and, first, particularly, to FIG. 1 thereof, there is shown a fuel assembly having a square cross section with a side length of 132.5 mm. Therein, room is provided by a spacer 2 in a square raster or arrangement with grid meshes 3 of square cross section, for receiving fuel rods 5 therein in a bundle of 9×9 rods. The fuel rods 5 have a diameter of 10.75 mm and are provided with uranium oxide pellets.

In addition to the fuel rods 5, the fuel assembly of FIG. 1 contains five fuel-free rods 6 in the place of five of the fuel rods, the fuel-free rods 6 being arranged symmetrically in the center of the fuel-assembly cross section, and more specifically, with a central fuel-free rod 6' and four fuel-free rods 6 which are arranged, as is apparent, at a spacing of one grid mesh from the grid mesh in which the central fuel-free rod 6' is received, so that, together, the fuel-free rods 6 define a rectangle extending over three grid meshes on the short side of the rectangle and over five grid meshes on the long side of the rectangle.

FIG. 2 shows another embodiment of the invention wherein four rods 6" without fuel are arranged cruciformly directly adjacent one another in the respective grid meshes thereof at the center of the fuel assembly 1. The other 77 grid meshes 3 of the spacer 2 are, in turn, occupied by the fuel rods 5.

It is clearly shown in FIGS. 1 and 2 that the cross section of the fuel-free rods coincides virtually completely with the square cross section of the respective grid meshes 3. In any event, it need be smaller only by so much i.e. have such a clearance from the sides of the respective grid meshes 3, that the rods 6 for a given spacer can be easily assembled and/or disassembled. If the side length of a grid mesh is 14.3 mm, for example, then the side length of the cross section of the rods 6 without fuel may be 13.7 mm, for example. In FIGS. 1 and 2, the cross section of the rods 6 is represented by uniform single-line hatching in a manner which would indicate that the moderator M for changing the moderation ratio were uniformly distributed. This may actually be the case if, for example, beryllium were used as a moderator. FIGS. 3 and 4 show, however, that fuel-free rods 6 with a cladding tube 8 having a cross section defined by a square rim or edge 9 can also be used. According to the embodiment of FIG. 3, the interior 10 of the cladding tubes 8 has a circular edge 12 so that the moderator contained therein, for example, in the form of cylindrical pallets, is well defined. FIG. 4, however, shows that the cladding tube 8 of the rods 6 may also have an interior 10 with an edge 13 which is also square like that of the outer edge thereof so that a uniform wall thickness is provided for the cladding tube 8.

The foregoing is a description corresponding in substance to German Application No. P 33 09 449.7, dated Mar. 16, 1983, the International priority of which is being claimed for the instant application, and which is hereby made part of this application. Any material discrepancies between the foregoing specification and the aforementioned corresponding German application are to be resolved in favor of the latter.

I claim:

1. Fuel assembly with a square cross section for water-cooled nuclear reactors, the fuel assembly having fuel rods disposed in a square array prescribed by spacers defining square grid meshes, comprising rods without fuel disposed, instead of the respective fuel rods, at individual positions of the square array distant from the marginal edge of the fuel-assembly cross section, for varying moderation ratio of the fuel assembly, said rods without fuel having a square cross section smaller than the cross section of the respective grid meshes only by a clearance sufficient for assembling said rods without fuel in the respective grid meshes and disassembling said rods without fuel from the respective grid meshes.

2. Fuel assembly according to claim 1 wherein said rods without fuel comprise respective cladding tubes enclosing moderator material therein.

3. Fuel assembly according to claim 2 wherein said cladding tubes have a cross section defined by a square outer and cylindrical inner edge.

4. Fuel assembly according to claim 1 wherein said rods without fuel are disposed symmetrically to the center of the fuel-assembly cross section.

5. Fuel assembly according to claim 4, wherein said rods without fuel have a cruciform arrangement.

* * * * *